June 22, 1948.  F. RIMMINGTON  2,443,776
REMOTE CONTROL SYSTEMS PARTICULARLY FOR ARC WELDING
Filed Oct. 18, 1943　　2 Sheets-Sheet 1

Inventor
FRANK RIMMINGTON
By
Emery Holcombe & Blair
Attorney

June 22, 1948.   F. RIMMINGTON   2,443,776
REMOTE CONTROL SYSTEMS PARTICULARLY FOR ARC WELDING
Filed Oct. 18, 1943   2 Sheets-Sheet 2

Inventor
FRANK RIMMINGTON
By
Emery, Holcombe & Blair
Attorney

Patented June 22, 1948

2,443,776

UNITED STATES PATENT OFFICE 2,443,776

REMOTE-CONTROL SYSTEM PARTICULARLY FOR ARC WELDING

Frank Rimmington, Potters Bar, England

Application October 18, 1943, Serial No. 506,746
In Great Britain October 14, 1942

11 Claims. (Cl. 315—302)

The present invention relates to the remote control of electric generators or other current supply means whereby the output of the generator or other current supply means may be varied or adjusted from a remote point. The invention is particularly applicable to the remote control of generators or transformers for arc welding.

It is well-known to those familiar with arc welding that it is frequently necessary to change or control the current output from the welding current generator or transformer. The controls for this purpose are generally arranged on the generator and when the operator is working some considerable distance from the generator, for example when welding the plates of a ship, it is necessary for him to leave his station to adjust the controls of the generator which results in a considerable waste of time. If a separate remote controlling rheostat is provided this needs an additional cable connection to the remote station which is undesirable.

It has been proposed in British Specification No. 450,141 to effect the remote control of the generator through the same pair of leads as feed the current to the welding tool by operating a controlling relay in accordance with the number of times the welding arc is struck. In this prior proposal the operating relay is connected in series with the welding arc so that when the welding electrode is contacted with the part to be welded in order to strike the arc, the arc is completely short-circuited and full current flows through the relay to operate it. On opening the arc the relay deenergizes and is ready to step the generator control a further step on the arc being short-circuited again. It will be appreciated that with this prior proposal the welding current continuously flows through the relay and the full output of the generator flows through the relay when the arc is short-circuited.

The present invention has for its object to provide an improved arrangement to which end the controlling circuit is shunted across the arc whereby when the arc is short-circuited, substantially no current flows through the controlling circuit and whilst the welding is being effected only a small proportion of the current flows therethrough. The current through the controlling circuit is increased on drawing out the arc. Thus by means of the arrangement according to this invention on decreasing or on shortening the arc the generator output may be controlled in one direction whilst on drawing out the arc it may be controlled in the opposite direction.

From another aspect the invention consists in a remote controlling arrangement for arc welding generators or other current supply means comprising a pair of voltage selective relays in series or parallel shunted across the arc circuit, one of which actuates to drive the means controlling the current output in one direction when the voltage in the controlling circuit is reduced below a predetermined value and the other of which actuates to drive the device for controlling the current output in the opposite direction when the voltage in the controlling circuit is increased above a predetermined value.

A feature of the invention consists in the provision of limit switches, which may if desired be adjusted to any desired value, so that the generator output current can only be controlled within the limit of the range of the particular work to be done.

A further feature of the present invention consists in the provision of means for preventing the current controller from being shifted when the arc circuit is short-circuited or open-circuited whereby whilst striking the arc or whilst welding is not taking place the adjustment of the current controller remains unaltered.

To this end the arrangement is provided with relays as described above for moving the current controller in one direction when the voltage across the arc is increased above a predetermined value and in the opposite direction when the voltage across the arc is decreased below a predetermined value, together with an additional relay or relays for interrupting the circuit of the motor adjusting the current controller when the arc is short-circuited and/or open-circuited.

With the arrangements above described the controlling action continues so long as the arc is held in the shortened or lengthened position and is stopped on restoring the electrode to its normal welding position.

A further object of the invention is to provide a modified arrangement in which the electrode may be held in its normal welding position with the normal welding arc while the adjustment is taking place so that the operator can see by the colour and behaviour of the arc when the current has reached the desired value.

To this end, according to a further feature of the invention, the shortening or drawing out of the arc is employed to initiate the movement of the output current controller in one direction or the other, the actuated relay then being retained or locked in the actuated position so that the current controller continues operating even through the arc be restored to its normal welding dimensions. The operator can then proceed with the weld and have a visual control, since the current will be falling or rising according to his requirements, while actually welding, and he will be able to see at once by the colour and behaviour of the arc when the current has reached the desired value. The movement of the current controller may then be stopped by increasing or decreasing the arc again which releases the locking means.

In order that the invention may be more clearly understood, various embodiments thereof will now be described, by way of example, with reference to the accompanying drawings in which.

The operation of the apparatus according to this invention is based on the fact that an arc welding generator or transformer of the variable voltage type adjusts the arc voltage to the requirements of the arc, and it has been found that the resulting voltage across the arc circuit with different positions of the electrodes is sufficiently constant to be able to control the operation of voltage selective relays depending upon the relative position of the electrodes. These voltage selective relays are selectively actuated in accordance with the positions of the electrodes to adjust the controller for the arc current.

The voltages which arise across the arc circuit for each of the five following electrode positions are listed below:

| Electrode Position | Arc Voltage |
|---|---|
| 1 Dead short and striking | Approximately nil rising rapidly to 25. |
| 2 "Scribbling" or "scratching" on work. | 18. |
| 3 Approx. 1" from work | 37. |
| 4 Open circuit | Maximum according to setting of voltage control. |
| 5 Normal welding | 20-30 settling down to approximately 25. |

Figure 1:
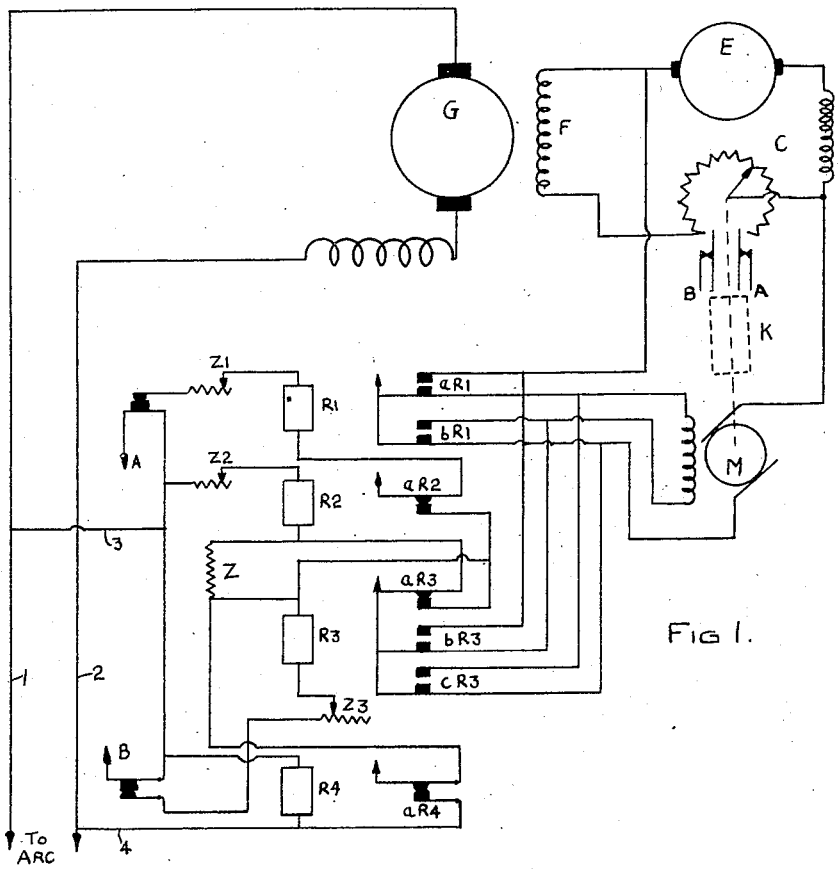
Figure 1 shows a circuit diagram of one embodiment of the invention for controlling the current for a generator.

Referring now to Figure 1 of the drawings, the output from the separately excited compound wound generator G is fed through the conductors 1 and 2 to the arc circuit and shunted across this arc circuit by the conductors 3 and 4 is the control circuit for controlling the operation of the motor M which drives the output current controller C which controls the output from the generator G. The current controller C comprises a resistance connected in series with the 110 volt series wound exciter E and the field winding F of the generator G so that by varying the position of the controller C the strength of the field F and thus the output of the generator G may be varied. The exciter E and generator G may be mounted on a common motor driven shaft.

This control circuit comprises four relays R1, R2, R3 and R4 which are so constructed or adjusted as to selectively operate at different voltages. The relay R1 is adjusted to be energized with the voltage produced by "scribbling" or scratching, that is a voltage less than 18 volts, and may conveniently energise at 10 volts. The relay R2 is adjusted to operate at the voltage produced during normal welding, by a voltage of between 20 to 25 volts. The relay R3 is adjusted so as to be energized when the arc is drawn out to about one inch from the work, that is at approximately 37 volts so that it does not energize during the normal welding. The relay R4 is adjusted to be energised only on open circuit of the arc.

The relays R1 and R3 control contacts as will be more fully described hereinafter for driving the motor M either in one direction or the other. The relay R1 will not, however, operate on a short circuit when the arc is being struck since the voltage then is less than the 10 volts necessary to energise it, so that its contacts are open to stop the motor. On scribbling or scratching the electrode on the work however, the voltage rises to 18 volts and energises relay R1 which closes its contacts aR1, bR1, to complete the circuit to the motor from the 110 volt exciter output in one direction thus driving the motor in the direction in which it turns the current controller C in a direction to reduce the current output from the generator. As soon as the arc is struck and the voltage across the arc is approximately 25 volts, the relay R2 is energised to open its contact aR2 which opens the circuit through the relay R1 which is thus deenergised and allows its contacts to open to stop the motor.

On further increasing the voltage across the arc by drawing the arc to a length of approximately one inch, the relay R3 also becomes energised, which relay opens its contact aR3 and closes its contacts bR3 and cR3. The closing of contacts bR3 and cR3 completes the circuit of the 110 volt exciter output to the motor M but in the reverse direction to that when the contacts aR1 and bR1 are closed, whereby the motor drives the current controller C in the direction to increase the output from the generator. Whilst R3 is energised R2 still remains energised to prevent relay R1 from energising, but in order to prevent relay R2 from becoming saturated due to excess current flowing therethrough which would affect the voltage at which it falls off, when R3 energises it opens its contact aR3 to connect the resistance Z in series with the relay R2 and thus prevent this undesirable condition from arising. As soon as the arc is reduced to its normal welding dimensions, the voltage falls to 25 volts thus allowing relay R3 to fall off to stop the motor.

On open-circuiting the arc, the relay R4 is energised which opens its contact aR4 to open the circuit to all the other relays R1, R2 and R3 so that these are all deenergised and the motor is not operated.

For the purpose of finely adjusting the voltages at which the relays R1, R2 and R3 become energised, variable resistances Z1, Z2, Z3 may be connected in the individual leads to these relays.

The motor shown in Figure 1 is a D. C. series field motor which is supplied from the generator field exciter. The type of motor used, however, forms no part of this invention and an A. C. motor may be used as shown, for example, in Figure 2 with of course appropriate modification in the number and type of contacts of the control relays R1 and R3 necessary for reversing the motor. The motor is geared down to say 3 R. P. M. and directly drives the current controller C. In order to prevent over-running and jamming of the motor at the limiting maximum and minimum positions of the current controller, two mechanically operated limit switches A and B are provided which are opened in the minimum and maximum positions respectively of the current controller to open the circuit through the control relays R1, R3 respectively to stop the motor.

Either one or both of these limit switches may be adjustable. Thus, for example, on manually adjusting the generator current controller for welding a particular type of material, the limit switches may be simultaneously moved so that the lower limit switch is adjusted to stop the motor at or just below the minimum current necessary whilst the upper limit switch is adjusted so as to allow the current controller to move to increase the current output to the maximum permissible value for that type of material.

From the above it will be seen that the motor is inoperative under the following conditions:

1. Short circuit of the arc when striking the arc, due to R1 not energising.
2. Open circuit of the arc due to R4 energising.
3. Normal welding conditions when R2 only is energised.
4. When the current controller has reached the minimum or maximum limit and has actuated mechanical contacts A or B.

The mode of using the apparatus is as follows:
Assuming an operator is welding and desires to reduce the current control setting, he scribbles the electrode on the work which reduces the voltage across the arc to approximately 18 volts. This deenergises relay R2 so completing the circuit of relay R1 which in turn completes the circuit of the control motor M to drive the current controller C in a direction reducing the current output, the motor continuing to run in that direction until the operator restrikes the arc. The voltage then rises to 25 volts and at 20 volts relay R2 energises and breaks the circuit of the motor by breaking the return circuit of the relay R1.

While the arc is being struck, the voltage rises from zero at dead short to 25 and at one point coincides with the critical value of R1. The relay R1, however, is made of the slow-acting type so that this does not cause the relay to energise and start the control motor, the voltage rising from 0 to 20 at which the relay R2 operates to break the circuit of R1 before the latter has time to respond to 10 volts and over.

In order to raise the current control setting, the operator increases the arc length to approximately one inch. The voltage across the arc then rises to 37 volts and energises relay R3 so completing the motor circuit in the opposite direction. This drives the current controller in a direction increasing the current output until the operator reduces the arc length by moving the electrode to the normal welding position. The voltage then drops to 25 volts and at 30 volts relay R3 deenergises and breaks the motor circuit.

On open-circuiting the arc to change an electrode or for any other reason relay R4 is energised to break the circuit for all the other relays, thus preventing the motor from operating and also avoiding saturation of the cores of the relays which might affect the voltages at which they selectively actuate. Normally, once the arc is broken, the operating cycle is always started by a dead short, namely, when the arc is re-struck. The only other possible variation is to scribble the electrode after first making a temporary dead short in order to trip relay R1 before restriking the arc. In practice this facility is desirable because the operator, having finished a job which requires more than normal current, may have occasion to break the arc in order either to fit a new electrode or re-arrange the work, and he may then wish to reduce the current setting before restriking the arc to proceed with the normal work which might otherwise be damaged if the arc were struck at the higher current setting.

Local adjustment of the current controller may be manually effected by providing a suitable clutch K in the drive between the motor and the current controller which enables the controller to be moved manually.

Figure 2:
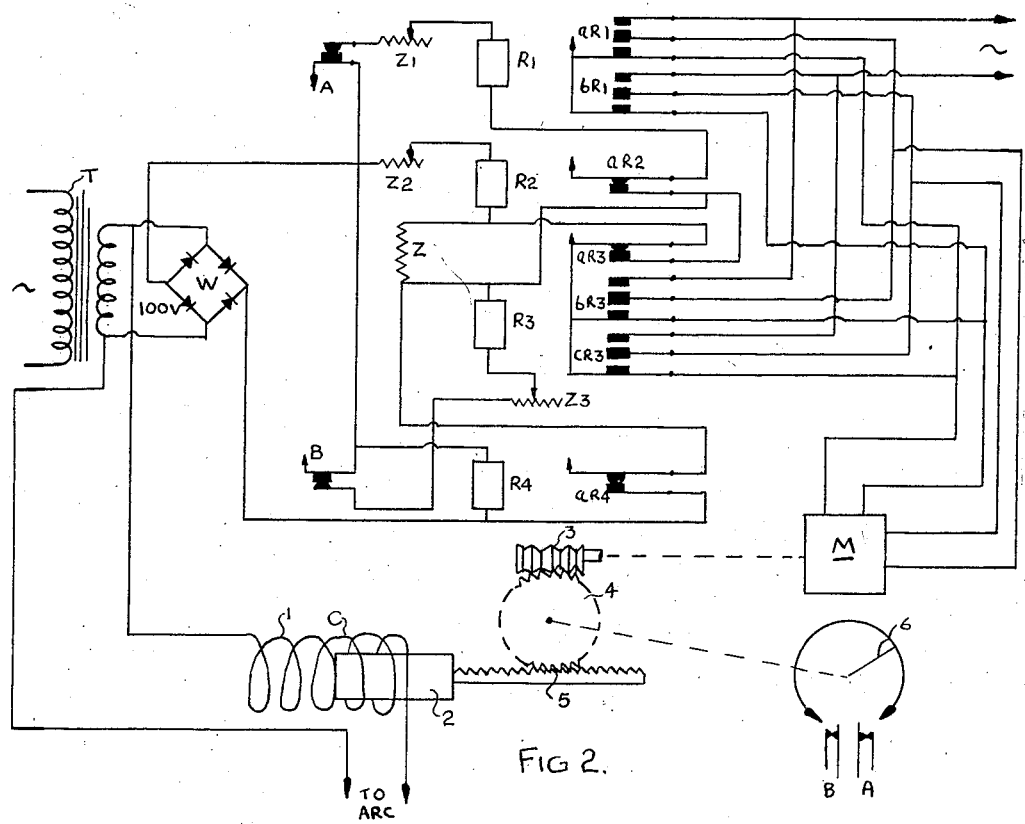
Figure 2 shows a modified circuit arrangement when the welding current is directed through a transformer from the A. C. mains.

The arrangement illustrated in Figure 1 is particularly designed for controlling the current output from an electric generator, but similar means can be used for controlling the welding current if it be derived from a current supply mains. For example, in A. C. welding it is common practice to derive the welding current from the A. C. mains through a welding transformer and in this case control means acting as above described can be used with the modification that the controlling relays should be A. C. relays and preferably of the solenoid type. Alternatively, as shown in Figure 2, the A. C. current derived from an A. C. generator or transformer T may be rectified by the rectifier W before it is fed to the D. C. controlling relays R1, R2, R3, R4 which effect the control of the position of the current controller C in the manner above described. The control circuit illustrated in Figure 2 is substantially identical with that shown in Figure 1 with the exception that additional relays are associated with the contacts R1 and R3 for the purpose of controlling the reversal of the motor which in this case is indicated as a reversible A. C. single-phase synchronous induction motor.

The control of the A. C. current supplied to the arc may be effected in any known manner. In Fig. 2, the controller C is shown as comprising a reactor 1 connected in series with the arc circuit and having a sliding core 2, which is moved in and out of the reactor by the motor M which drives the core through the worm 3, the toothed wheel 4 and the toothed rack 5. The wheel 4 is also coupled to an arm 6 for actuating the limit switches A and B.

The provision of the controlling relays in accordance with this invention in A. C. welding equipment has the further advantage that when the welding electrode is open-circuited, the output of the transformer flows through the control circuit thereby reducing the danger of electric shock from the welding electrode if it should be accidentally touched.

Figure 3:
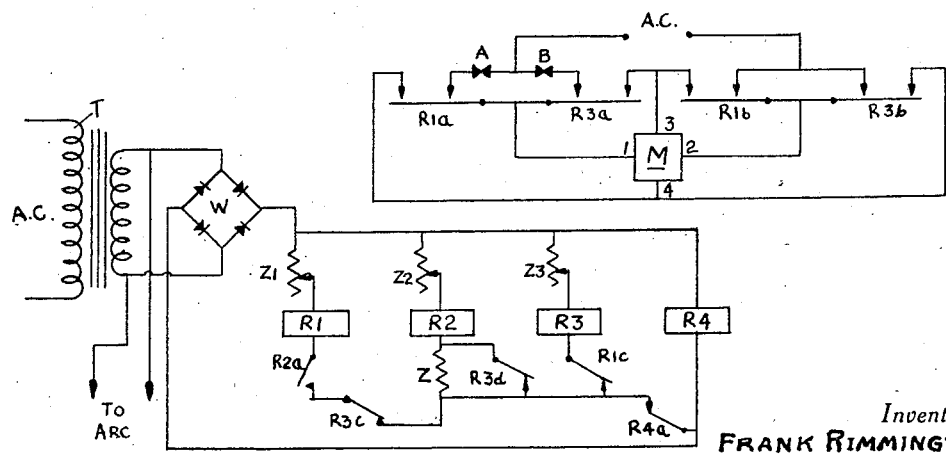
Figure 3 shows a further modification.

With the embodiments described with reference to Figures 1 and 2, the controlling action continues only so long as the arc is held in the shortened or lengthened position and is stopped when the electrode is restored to its normal welding position. Figure 3 shows a modification in which the electrode may be held in its normal welding position with the normal welding arc while adjustment is taking place so that the operator can see by the colour and behaviour of the arc when the current has reached the desired value. This modification is made possible by employing relays R1 and R3 with impulse locking and releasing means so that on the first impulse being sent through one or other of these relays, that relay is actuated and locked in the actuated position and is only released to stop the motor upon a second impulse being sent through that relay by again shortening or lengthening the arc. The first impulse thus initiates the operation of one or other of these relays and the electrode may then be returned to the normal welding position thus giving the operator the advantage of having a visual control, since the current will be falling or rising according as to whether he has sent an impulse corresponding to a shortening or lengthening of the arc, while he is actually welding and as soon as he sees by the colour and behaviour of the arc that the desired current setting has been reached, he again shortens or lengthens the arc to send a second impulse to release the relay contacts and stop the motor.

Referring more particularly to Figure 3, the control circuit is shown for controlling the current from an A. C. transformer, the control circuit being shunted across the arc circuit via the rectifier W. The control circuit again comprises four relays R1, R2, R3 and R4 but the relays R1 and R3 are of the known impulse mechanical locking and releasing type. Thus when an impulse is sent through relay R1 or R3 it energizes to attract and mechanically lock its contacts in the operated position even when the relay itself falls off, the contacts only being released when a second impulse is sent through the relay. The relays R2 and R4 are energized when the voltage corresponds with the normal welding current and on open-circuit respectively as in the previous examples.

Figure 4:
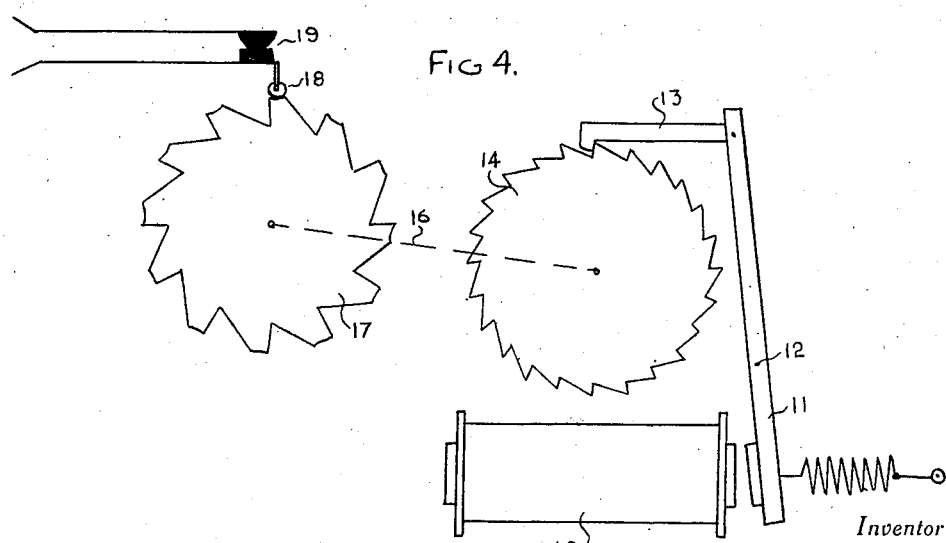
Figure 4 shows a form of impulse locking and releasing relay.

One practical form which the impulse locking and releasing relays R1 and R3 may assume is shown in Fig. 4. In this figure 10 is the relay coil which actuates an armature 11 pivoted at 12, the opposite end of which carries a pawl 13 co-acting with a rotatable ratchet wheel 14 to step the latter round at each stroke of the armature. 15 is a return spring for restoring the armature to the position shown in the drawing. Also carried on the shaft 16 of the ratchet wheel 14 is a toothed cam wheel 17 having one half the number of teeth as the ratchet wheel 14. Thus at each step of the ratchet wheel 14 the member 18 actuating the switch contacts 19 of the relay is alternately raised on to the crest of one of the cams and lowered into one of the intermediate spaces of the cam wheel 17. Thus once the switch contacts are closed by the member 18 being raised on to one of the crests of the cam, the switch contacts remain in the actuated position until the relay is again energized to step the ratchet wheel of the cam wheel 17 round to the next intermediate space position.

Assuming the electrode to be in its normal welding position with the normal welding arc, the relay R2 only is energised. If the operator desires to reduce the current control setting, he scribbles the electrode on the work and then restrikes the arc immediately. This scribbling de-energises the relay R2 due to the voltage across the arc dropping below 20 volts and through its contact R2a, which is open when R2 is energised, closes the circuit of the relay 1 from one side of the rectifier W through the resistance Z1, relay R1, contact R2a, contact R3c (of the relay R3 which contact is closed when relay R3 is de-energized) contact R4a (of the relay R4 which contact is closed while relay R4 is deenergized) to the other side of the rectifier W. Relay R1 then operates and locks its three contacts R1a, R1b and R1c in their actuated positions. Contacts R1a and R1b complete the circuit from the A. C. mains to the motor M to drive the motor in one direction while contact R1c opens the circuit through the relay R3 thus preventing it from operating whilst R1 is operated by its first impulse. The motor M drives the current controller in a direction reducing the current output during which time, as the operator has restruck the arc, the result of the reduction in current output will be visible in the colour and behaviour of the arc. As soon as the desired conditions are reached, the operator again scribbles the electrode on the work which sends a further impulse through the relay R1 over the circuit previously mentioned to release the contacts of the relay R1 which thus stops the motor and closes its contact R1c. The arc is again restruck and welding proceeds at the reduced current value.

To raise the current control setting, the operator draws a long arc which energises relay R3 through the circuit from one side of the rectifier W, resistance Z3, relay R3, contact R1c, contact R4a, to the other side of the rectifier W. Relay R3 actuates to operate its four contacts R3a, R3b, R3c and R3d. At its contacts R3a and R3b it closes the circuit of the motor M to drive the motor in the reverse direction and at its contact R3c it opens the circuit through relay R1 thus preventing R1 from being operated whilst the relay R3 has been actuated by a first impulse. Contacts R3d opens the short circuit across the resistor Z in series with the relay R2 to prevent this relay from being saturated. Immediately after drawing out the arc to operate the relay R3, the operator returns the electrode to the normal welding position and proceeds with the welding. Although this reduces the voltage across the arc circuit to 25 volts, the contacts of relay R3 remain mechanically locked in the operated position. The control motor now turns the current controller towards the maximum and the operator will be able to see by observing the arc when the desired current value has been reached. The motor is then stopped by again drawing a long arc to send a second impulse through the relay R3 which unlocks its contacts thus stopping the motor and closing its contact R3c so that the relay R1 can be again energised if desired. The electrode is then restored to its welding position and welding proceeds at the new current setting.

The provision of the contacts R3c and R1c in the circuits of the relays R1 and R3 respectively guards against damaging the control motor should the operator forget that it has been set in motion in say the "down" direction and then draws a long arc to operate it in the "up" direction, since these contacts make it impossible to operate one of these relays whilst the contacts of the other are locked in their operating positions. Thus if the operator has scribbled on the arc to reduce the current, he cannot reverse the motor by drawing a long arc before he again scribbles to stop the motor and vice versa.

The limit contacts A and B are connected in one of the motor mains leads as shown in the diagram. This is essential in order to protect the motor against jamming should the operator forget that he has set it in motion and then stops welding before stopping the motor by scribbling or drawing a long arc according to his initiating action. The motor would also jam without this protection if he should forget that he has set it in motion and continues to weld. The arrangement also protects the motor should the welding current fail for any reason while the mains feeding the motor are still normal.

I claim:

1. Arrangement for the remote control of the current supply in electric arc welding systems, comprising an output current controller for controlling the current supply to the arc circuit, a control circuit comprising a pair of voltage selective relays shunted across the arc circuit, means for driving the output current controller in one direction when one of the relays actuates upon the voltage in the control circuit being reduced below a predetermined value, means for driving the output current controller in the opposite direction when the second relay actuates upon the voltage in the control circuit being increased above a predetermined value, means for locking the actuated relay in the actuated position so that the output current controller continues to be driven even though the arc be restored to its normal welding position, and means for releasing the locking means to stop the output current controller upon the voltage across the control circuit being again altered to a value different from that during normal welding.

2. Arrangement as claimed in claim 1, wherein the relays are of the impulse locking and releasing type so that on a first impulse being sent one of the relays (depending upon the voltage of the impulse) is actuated and locked in the actuated position, that relay only being released upon a second impulse of appropriate voltage being sent through the relay.

3. Arrangement as claimed in claim 1, wherein means are provided for preventing the operator, when he has actuated a relay to operate the output current controller in one direction, from actuating the relay for operating the output current controller in the opposite direction before he has again applied the appropriate voltage across the control circuit to release the relay which has already been actuated.

4. Arrangement for the remote control of the current supply in electric arc welding systems, comprising an output current controller for controlling the current supply to the arc circuit, a control circuit shunted across the arc circuit and responsive to voltage variations across the arc circuit, means for adjusting the output current controller in accordance with the response of the control circuit to voltage changes across the arc circuit, and means for preventing the output current controller from being shifted when the arc circuit is short-circuited.

5. Arrangement for the remote control of the current supply in electric arc welding systems, comprising an output current controller for controlling the current supply to the arc circuit, a control circuit shunted across the arc circuit and responsive to voltage variations across the arc circuit, means for adjusting the output current controller in accordance with the response of the control circuit to voltage changes across the arc circuit, and means for preventing the output current controller from being shifted when the arc circuit is open-circuited.

6. Arrangement for the remote control of the current supply in electric arc welding systems, comprising an output current controller for controlling the current supply to the arc circuit, a control circuit comprising a pair of voltage selective relays shunted across the arc circuit, means for driving the output current controller in one direction when one of the relays actuates upon the voltage in the control circuit being reduced below a predetermined value, means for driving the output current controller in the opposite direction when the second relay actuates upon the voltage in the control circuit being increased above a predetermined value, and means in said control circuit which stops the driving means when the arc is short-circuited.

7. Arrangement for the remote control of the current supply in electric arc welding systems, comprising an output current controller for controlling the current supply to the arc circuit, a control circuit comprising a pair of voltage selective relays shunted across the arc circuit, means for driving the output current controller in one direction when one of the relays actuates upon the voltage in the control circuit being reduced below a predetermined value, means for driving the output current controller in the opposite direction when the second relay actuates upon the voltage in the control circuit being increased above a predetermined value, and an additional relay in said control circuit which stops the driving means when the arc is open-circuited.

8. Arrangement for the remote control of the current supply in electric arc welding systems, comprising an output current controller for controlling the current supply to the arc circuit, a control circuit comprising four voltage selective relays shunted across the arc circuit and arranged to energise and operate respectively when voltages appear across the arc circuit as follows: (1) at the voltage produced by scribbling or scratching, (2) at the voltage produced during normal welding, (3) at the voltage produced when the arc is drawn out to approximately one inch from the work, and (4) at the voltage produced on open circuit of the arc, a reversible electric motor for driving the output current controller, contacts associated with the first relay which close upon energisation thereof to drive the motor in one direction, contacts actuated by the second relay when energised to open the circuit through said first relay, contacts actuated by said third relay when energised to drive the motor in the opposite direction, and contacts actuated by the fourth relay when energised to interrupt the circuit of all the other relays.

9. Arrangement as claimed in claim 8, wherein a resistance is connected in series with a relay for fine adjustment of the voltage at which it operates.

10. Arrangement as claimed in claim 8, wherein a resistance is connected in series with the second relay which remains actuated at all voltages above the normal welding voltage until the apparatus is de-energised by open-circuiting.

11. Arrangement as claimed in claim 8, wherein two mechanically operated limit switches are provided which are operated respectively in the minimum and maximum positions of the output current controller to stop the motor when the output current controller reaches either of its limiting positions.

FRANK RIMMINGTON.

REFERENCES CITED

The following references are of record in the file of this patent:

UNITED STATES PATENTS

| Number | Name | Date |
|---|---|---|
| 1,074,704 | Leitner | Oct. 8, 1912 |
| 1,253,198 | Montgomery | Jan. 8, 1918 |
| 1,265,342 | Kenyon | May 7, 1918 |
| 1,746,630 | Bergvall | Feb. 11, 1930 |
| 1,865,949 | Nycum | July 5, 1932 |
| 1,878,340 | Spaulding | Sept. 20, 1932 |